March 31, 1959 N. R. BROWNYER 2,880,041
BEARING MOUNTING STRUCTURE
Filed March 29, 1955 4 Sheets-Sheet 2

INVENTOR
NELSON R. BROWNYER

BY *Strauch, Nolan & Diggins*
ATTORNEYS

March 31, 1959 N. R. BROWNYER 2,880,041
BEARING MOUNTING STRUCTURE
Filed March 29, 1955 4 Sheets-Sheet 3

INVENTOR
NELSON R. BROWNYER

BY Strauch, Nolan & Diggins
ATTORNEY

March 31, 1959  N. R. BROWNYER  2,880,041
BEARING MOUNTING STRUCTURE
Filed March 29, 1955  4 Sheets-Sheet 4

INVENTOR
NELSON R. BROWNYER

BY *Strauch, Nolan & Diggins*

ATTORNEYS

United States Patent Office 2,880,041
Patented Mar. 31, 1959

2,880,041

BEARING MOUNTING STRUCTURE

Nelson R. Brownyer, Detroit, Mich., assignor to Rockwell-Standard Corporation, a corporation of Pennsylvania Application March 29, 1955, Serial No. 497,716

7 Claims. (Cl. 308—207)

This invention relates to motor vehicle drive axles and more particularly to a novel structure providing accurate mounting and preload adjustment for the differential cage support bearings, and novel method and apparatus for assembling the support structure.

This invention contemplates improvements in differential support bearings which in prior conventional structure often have unreasonably short life. This short life appears to be a result of certain factors or combinations of factors such as pinched or tight outer bearing races, cocked bearing races resulting from mismatched carrier support leg and bearing cap bore threads, misfitted bearing adjusting ring nut threads, and inconsistent bearing preload adjustment. The pinched or tight bearing race factor can be readily eliminated as a trouble source by providing a free bearing fit within the carrier support bores, but a resultant creeping of the outer bearing race introduces an added problem of wear on the adjusting ring nut.

This invention solves the problem of wear on the bearing abutment face of the adjusting ring nut as well as the problem of cocked or pinched outer bearing races and in addition insures installations with consistent bearing preloads within acceptable limits. The improved differential support bearing mounting of the invention eliminates conventional carrier leg and bearing cap bore threads and adjusting ring nuts such as illustrated for example in U.S. Letters Patent No. 2,183,667 to L. R. Buckendale. Instead of an adjusting ring nut and threaded bore, the present invention uses selectively fitted split spacer rings disposed in grooves in the carrier leg and bearing cap bores. The split ends of the ring cooperate in a novel manner with the carrier legs and caps to maintain the rings against creep in the grooves. The rings can be accurately forced to provide excellent abutments for the sides of the outer races of the differential bearings. To eliminate the problem of pinched or tight bearing races, the carrier leg and bearing cap bores are dimensioned to provide a free loose fit for the outer bearing race. The split rings, which can be conveniently and economically hardened, substantially eliminate the problem of wear incident to creeping bearing races. By selecting adequate split ring thickness and assembling the differential carrier, bearings and rings in a specified novel manner, a bearing preload within desired limits can be obtained with highly desirable consistency.

Each of the foregoing troublesome factors which have been eliminated will materially aid in increasing the satisfactory operation of each assembled differential cage and carrier. All cage and carrier assemblies will approach a consistent standardization in so far as bearing preload and drag are concerned, with resultant longer bearing life. Elimination of the threaded carrier leg and bearing cap bore saves initial production, assembly and adjustment time. The assembled carrier and differential cage is more economical to produce and, because of increased bearing life, is more economical to use than the conventional carrier mountings, and yet the installation is rugged and dependable.

Accordingly, a primary object of this invention is to provide an improved preloaded bearing mounting.

Another object is to provide, in a drive axle assembly, a novel carrier and differential cage support bearing mounting with adjustment for obtaining desired bearing preload.

A further object resides in the provision in a drive axle assembly of a novel split ring and a cooperating groove arrangement in a differential carrier leg and bearing cap to obtain an accurate abutment surface for the outer race of a differential support bearing.

A still further object resides in the provision in a drive axle assembly of carrier leg and bearing cap bores of sufficient dimension to enable a free loose fit of the outer race of the differential support bearing, thus permitting proper abutment against the split ring and preventing the bearing race from being pinched or cocked.

Another object, in conjunction with the novel split ring bearing race abutment and the free loose fit of a differential cage support bearing in the carrier leg and bearing bore, is the provision of novel hardened split rings providing hardened abutment surfaces for the loose fit bearing races.

Still another object resides in the provision of novel means, such as a disk key placed between the ends of the split ring or nibs formed on the ends of the split rings, cooperating between the split rings and the carrier legs and caps for preventing creep of the split rings in the assembled carrier and differential cage.

A further object resides in the provision of special tools, including two accurately ground reference adjusting rings and a clamping jig consisting of a draw bar and two draw plates, for aiding in the adjustment and assembly of a differential cage, bearings, and carrier utilizing the novel split ring mounting structure of this invention.

A still further object resides in the provision of a novel procedure for adjustment and assembly of a differential cage, bearings and carrier utilizing the novel split ring mounting structure of this invention.

Another object resides in novel variations of the adjustment and assembly procedure depending upon the availability of the novel clamping jig.

Further objects of this invention will become apparent from the following detailed description and the appended claims taken in conjunction with the accompanying drawings of various embodiments thereof, in which:

Figure 1:
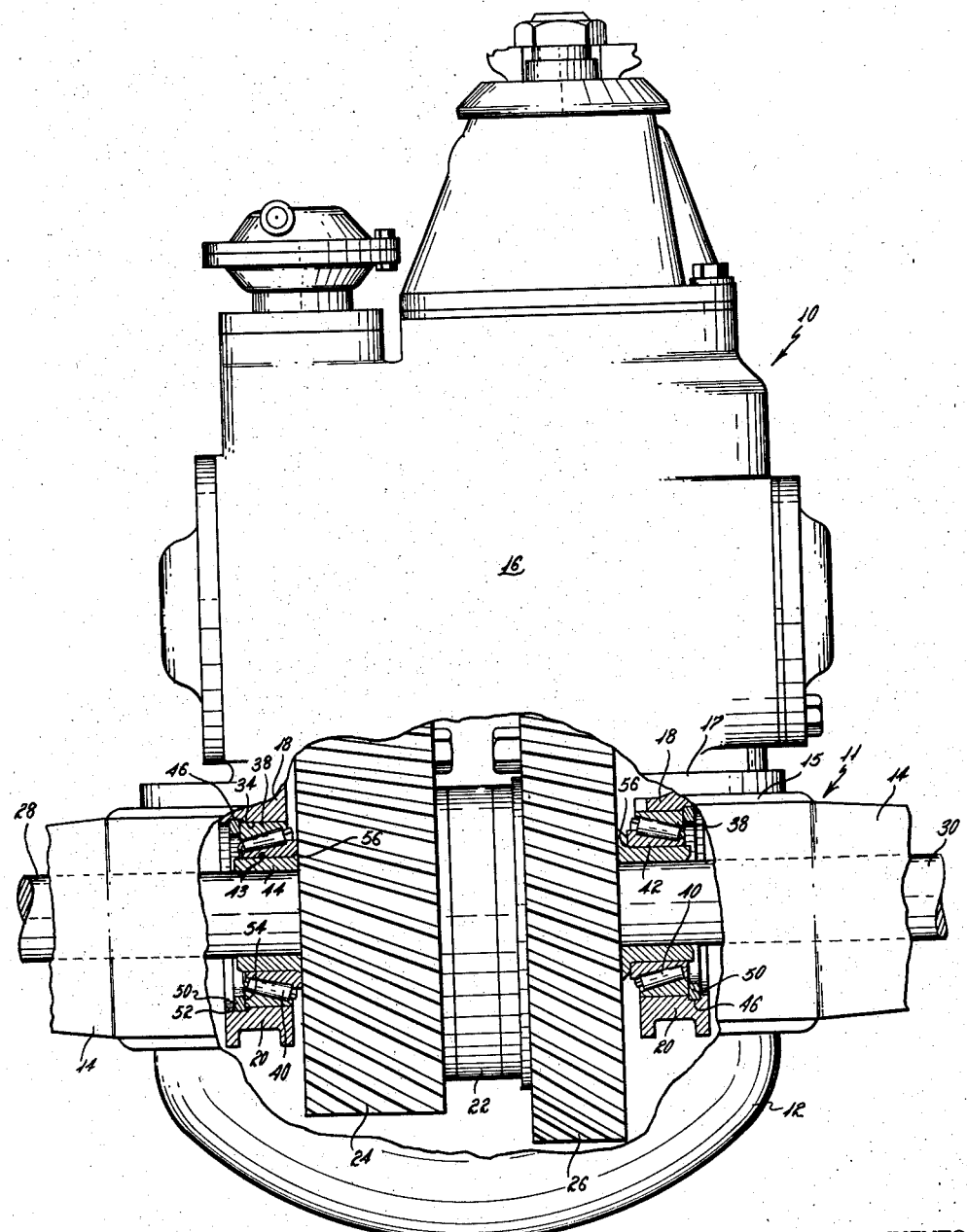
Figure 1 is a plan view of a representative axle assembly with portions of housing broken away to show the novel carrier support legs, split rings and differential support bearing mounting of this invention.

Referring to the drawings, wherein like reference numerals are used to indicate similar parts throughout, Figure 1 shows a two-speed double reduction drive axle assembly 10 utilizing this invention. The illustrated drive axle is only representative of various drive axles wherein the invention can be used and the invention is not intended to be limited to any specific type of drive axle.

Drive axle assembly 10 includes an axle housing 11 having a differential housing portion 12 and axle housing arms 14 extending therefrom at each side. The front face of differential housing portion 12 has an opening surrounded by a mounting surface 15. A differential carrier 16 with an integral mounting flange 17 is supported on and rigidly fastened to the housing mounting surface 15 as by conventional studs and nuts. In assembled relation, two integral support legs 18 extend rigidly from carrier 16 into the interior of the differential housing portion 12 and, with bearing caps 20, provide journal support for a differential cage assembly 22.

The carrier 16 houses a conventional variable speed double reduction gear mechanism including an input drive connection not illustrated here, and the differential cage assembly 22 has two gears 24 and 26 non-rotatably fixed to opposite sides of the cage casing. These gears 24 and 26 mesh with corresponding gears of the two speed double reduction mechanism within carrier 16. Axle shafts 28 and 30 are splined to the side gears (not shown) of the usual differential assembly 22 and project from opposite sides of the differential cage through the axle housing arms to be drive connected to the wheels.

Figure 2:
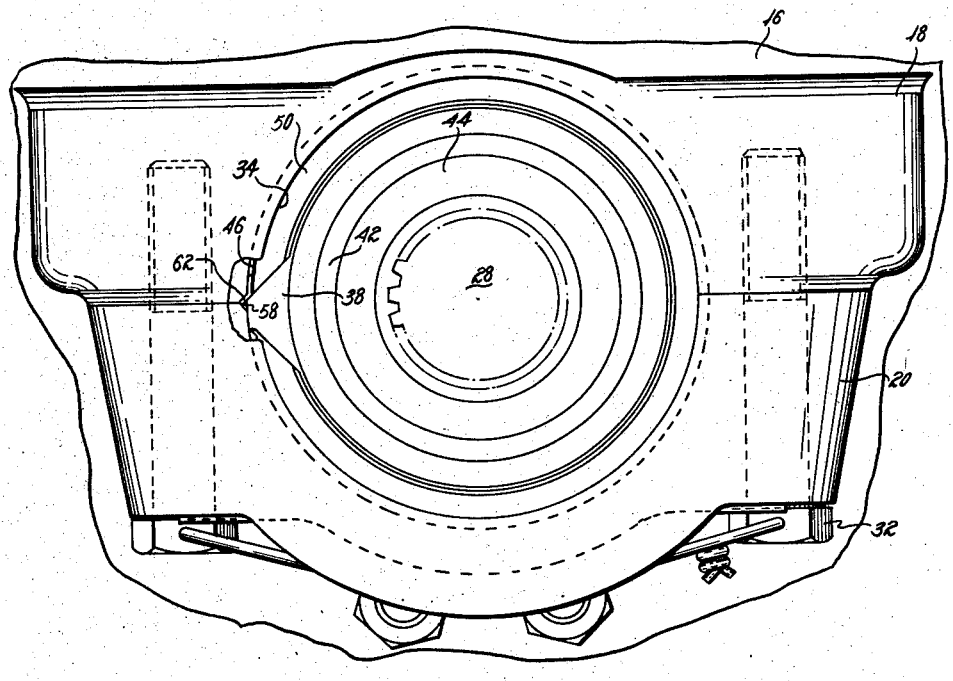
Figure 2 is an enlarged side view of a carrier support leg and bearing cap with the preferred embodiment of a modified split ring in assembled relationship.
Figure 6:
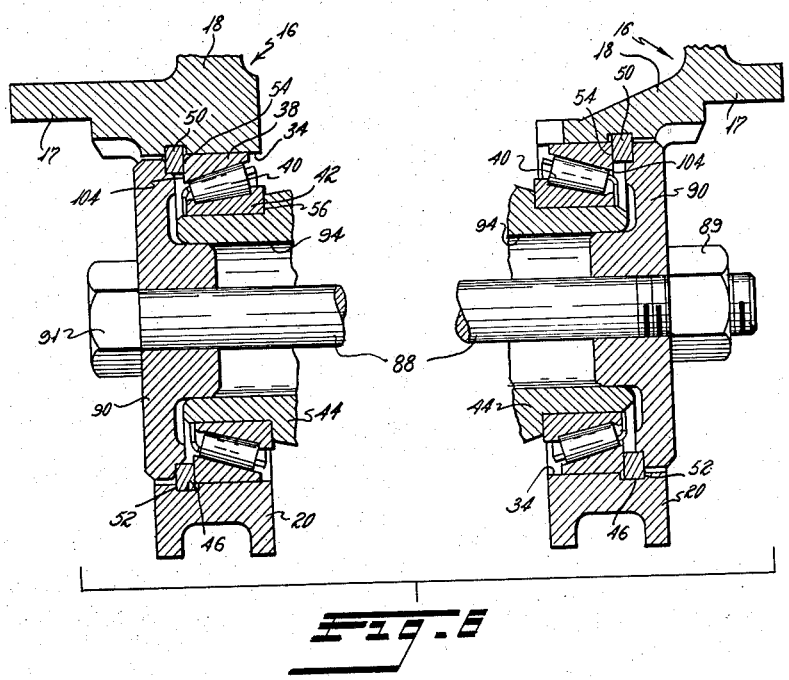
Figure 6 is a plan view similar to Figure 5 showing the differential cage assembly with support bearings and split spacer rings clamped in assembly and placed in position in the carrier support legs with the leg caps fastened in place prior to removing the clamping jig according to the novel method of the invention.

With references to Figures 1, 2 and 6, the two spaced carrier legs 18 with identical bearing caps 20, rigidly fastened thereto by cap screws 32, are formed with smooth aligned coextensive bores 34 of the same size one half of each bore being in the carrier leg and the other half in the bearing cap. Each bore 34 receives the outer race 38 of a tapered bearing assembly 40 with a free loose fit. The inner race 42 of each bearing assembly 40 is press fitted on the smooth cylindrical surface 43 of side extension 44 of the differential cage 22. An annular groove 46 is provided in each bore 34 adjacent its outer side and this annular groove is also diametrically split so one half is formed in the bearing cap 20 and the other half is formed in the integral carrier leg 18.

Within each of the annular grooves 46 is a hardened steel split spacer ring 50. Each ring 50 is of uniform essentially rectangular cross section throughout with parallel flat sides providing right angled corners. The spacer rings 50 are selectively fitted, in a manner to be described more fully hereinafter, within the grooves 46 and since they tend to expand therein they have a tight fit against the groove bottoms. The rings 50 in final assembly (Figures 1 and 2) abut the outer side walls 52 of their respective grooves 46 and the inner sides 54 of the rings provide rigid abutment faces tightly engaged by the outer races 38 of bearing assemblies 40. The inner races 42 of the two bearing assemblies 40 are disposed in rigid spaced relationship by abutment against shoulders 56 formed on the cylindrical cage extensions 44. Grooves 46 in the two carrier legs 18 and bearing caps 20 are disposed in a fixed spaced relationship, being provided in the integral or rigidly assembled carrier 16. Thus the axial dimension or thickness of the spacer rings 50 will determine the spaced relationship between the outer bearing races 38 which in turn determines the preload on both bearing assemblies 40.

Figure 3:
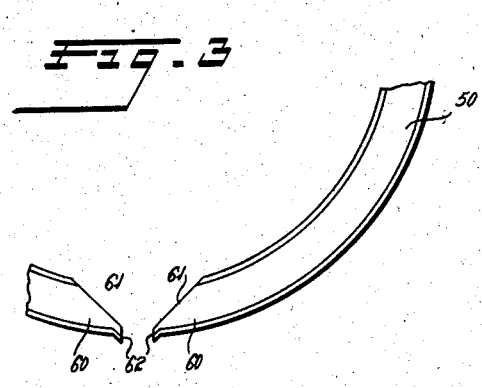
Figure 3 is an enlarged detail view of the ends of the split ring of Figure 2.

Provision is made to positively insure against possible spacer ring creep within the groove 46. Different embodiments of means to prevent such rotation are illustrated in the drawings and the preferred arrangement is shown in Figures 2 and 3. The matching edges of the bottom wall of annular groove 46, at the planar parting joint of each carrier leg 18 and bearing cap 20, are chamfered to form a transverse groove 58 in the bottom wall of annular groove 46 at one side of each carrier leg. Each split spacer ring 50 (Figure 3) has its free ends 60 beveled at 61 so as to approach each other in points which at their extremities are radially outwardly turned to provide short projecting nibs 62. When a spacer ring 50 is assembled, the nib 62 on one end is placed in the transverse groove 58 and retained there by the spring effect of the spacer ring 50 retained in the annular groove 46. The nib 62 on the other end of the ring 50 will rest on the bottom of groove 46 and cause a short extent of the spacer ring to be raised away from the bottom of the annular groove 46. However the depth of the annular groove 46 is sufficient to provide adequate abutting surface on the side of spacer ring 50 to enable it to function properly as a fixed, squared abutment for the outer race 38 of the associated bearing assembly 40. If desired only one end of the ring 50 need be provided with a nib 62, but by providing nibs at both ends the rings are reversible.

Figure 4:
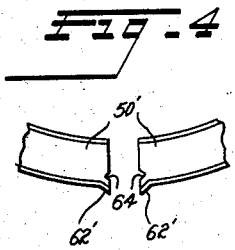
Figure 4 is an enlarged detail view of the ends of a modified split ring that may be used in the assembly of Figure 2.

Figure 4 illustrates a modified spacer ring 50′ having nibs 62′ formed by striking the ring ends with a chisel at 64. This ring 50′ is otherwise the same and is used in the same manner as that described for ring 50.

Figure 7:
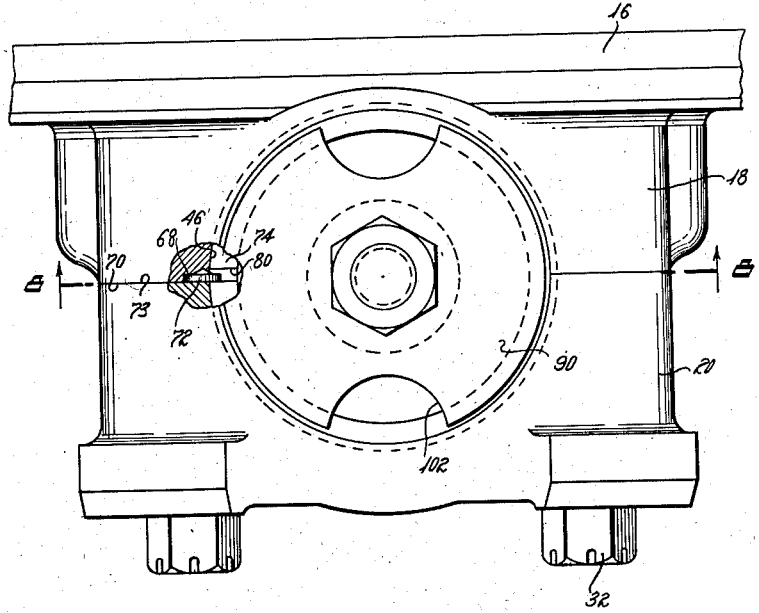
Figure 7 is a side elevation of Figure 6 and shows a modification of means for preventing rotation of the split spacer rings.
Figure 8:
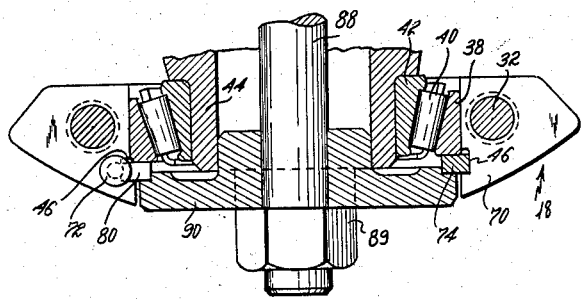
Figure 8 is a detail elevation view taken on line 8—8 of Figure 7, showing the modified end face of the carrier support leg.

An alternative means for preventing split ring rotation is shown in Figures 7 and 8. This embodiment does not require special nibs on the ends of a split ring. Figure 8 shows the bottom of differential carrier leg 18 and a particircular recess 68 is provided in each carrier leg and face 70 with a disc shaped key 72 disposed therein flush with or below the end face 70 which is abutted by the flat top face 73 of attached bearing cap 20. The recess 68 intersects the profile of groove 46 so that a sector shaped portion of the disc key 72 projects into the annular groove 46. Split spacer rings 74 when assembled are positioned in annular grooves 46 with their flat ends 80 on opposite sides of the projecting sector portions of the respective disc keys 72 and thereby will be prevented from creeping in the annular grooves 46.

All spacer rings have an accurately controlled predetermined thickness and are accurately squared. Preferably the inner and outer peripheral edges are slightly chamfered to insure an accurate fit within and against the outer walls of the annular grooves. Rings of the proper thickness are installed in each carrier assembly to assure proper bearing preloading.

*Method and apparatus for adjustment and assembly*

Except for different means for preventing spacer ring rotation in the annular groove 46, the method of assembling and the function of the spacers rings 50, 50′ and 74 in the carrier assembly are the same hence the following method will be described only for assembling the preferred spacer ring 50.

The hardened steel split spacer rings 50 are selectively fitted with a particular differential cage, bearing and carrier assembly so that the total differential bearing drag will fall within desired limits. Factors such as the type, design or installation of the axle effect the desired limits. Using special tools, such as the two very accurately ground reference rings 86 (Figure 5), a draw bar 88 with adjusting nut 89, two identical draw plates 90, a torque wrench and various gauges, a definite assembly procedure is used in the selective fitting of rings 50 to control the bearing preload so that bearing drag falls within the desired limits. Each ring 86 is made of hard tool steel having flat parallel sides perpendicular to its axis. The reference rings 86 may or may not be split as is desired. The width of each ring is accurately known and is made equal to the thickness of the thinnest split rings likely to be required for production. In addition, a set of different thickness production rings 50 is provided.

A description of the procedure used for assembling the illustrated differential cage and bearings in the carrier will be described using as the desired total differential bearing drag limits, the values of 15 to 35 pound-inches.

A side face of each draw plate 90 is provided with a cylindrical projection 92 which is piloted during the assembly procedure within the bore 94 of respective side extensions 44 of the differential cage 22. On the same face of each draw plate, closely adjacent its periphery, is an arcuate rim 96 providing a cylindrical ring piloting shoulder 98 concentric with the cylindrical projection 92. A continuous flat ring engaging face 99 perpendicular to the axis of plate 90 is provided outwardly of shoulder 98. An aperture 100 is formed in each plate 90 substantially concentric with the cylindrical projection 92. The plates 90 are circular with a diameter sufficiently less than that of the bearing receiving bores 34 to enable a clearance between the plate periphery and the bearing bore surface during the assembly steps. As illustrated in Figure 7, cutouts 102 may be formed in the plates 90 to provide a clear view of the relationship between rings and groove and to provide access for measuring clearances.

Bearing assemblies 40 have their inner races 42 press fitted on the differential cage side extensions 44. A draw plate 90, piloting a reference ring 86, accurately ground to 0.290 inch thickness, on the draw plate shoulder 98, is positioned on each end of the differential cage side extensions 44 with the draw plate cylindrical projections piloted in side extension bores 94. In this position the inner flat sides of references rings 86 abut respective side faces 104 of the outer bearing races 38, and the outer flat sides of rings 86 abut ring faces 99. The draw bar 88 which at one end has an enlarged head 91 is inserted through one draw plate 90, the differential cage assembly 22 and the other draw plate 90 and the whole assembly clamped together by means of the draw bar nut 89. Using suitable means such as a torque wrench, the draw bar nut is torqued to 25 pound-feet. In this installation, a torque value of 25 pound-feet on the draw bar nut results in approximately 28 pound-inches total differential bearing drag which is within the desired limits of 15 to 35 pound-inches.

Figure 5:
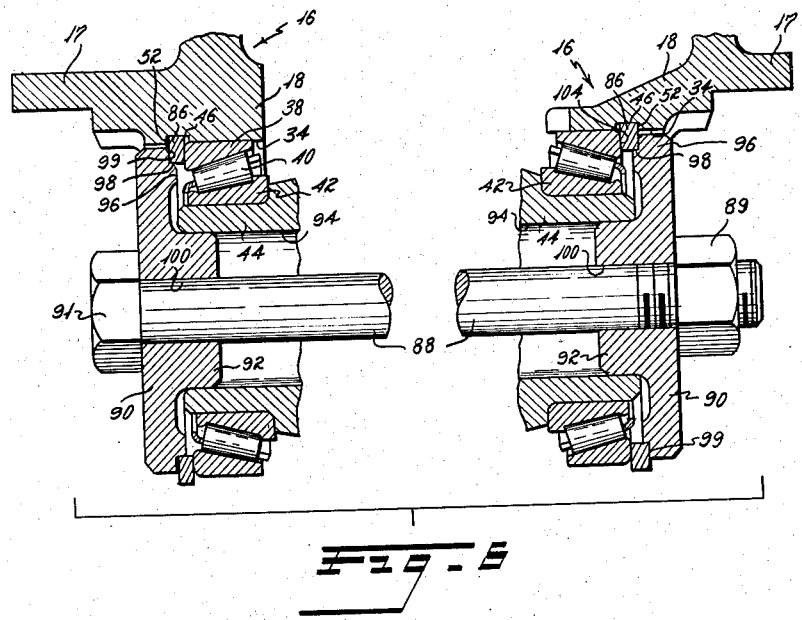
Figure 5 is a broken partially sectioned plan view showing the differential cage assembly with support bearings and reference rings clamped in assembly and placed in position in the carrier support legs prior to measuring the assembly end play according to the novel method of the invention.

The clamped assembly is then placed in position in carrier legs 18 with the bearing caps 20 removed (Figure 5). The reference rings 86 fit into the carrier portion of annular grooves 46 with a certain amount of axial clearance or end play. End play is the amount of axial shift which occurs when the clamped assembly is moved from a position with one reference ring 86 in abutment with the outer wall 52 of its groove 46 to a position with the other reference ring 86 in abutment with the outer wall 52 of its groove 46. This end play is readily measured with an indicator gauge. This measurement may be accomplished through the cutout 102 of the draw plate 90. The clamped assembly is then removed from the carrier legs, unclamped, the reference rings 86 replaced by selected split spacer rings 50 of accurately known thickness, and the assembly reclamped with the draw plates and draw bar jig. The total thickness of both selected split spacer rings 50 is equal to twice the thickness of reference rings 86, plus the measured end play, plus tolerance of 0.012 to 0.017 inch. To enable proper split spacer ring selection for the illustrated axle assembly, spacer rings 50 of various thicknesses ground with increments of 0.005 inch are provided, and for example should cover the range of thicknesses between 0.290 to 0.330 inch.

With the proper thickness selected split spacer rings 50 in the clamped assembly the draw bar nut 89 is torqued to between 75 and 100 pound-feet as required to permit the assembly to be positioned in the carrier legs 18 with the split spacer rings disposed in the carrier leg portions of annular grooves 46. For the example being described, a clamping torque of 75 pound-feet is a borderline condition that permits the clamped differential assembly to properly fit in the carrier legs in approximately 50% of the units. Before placing the clamped assembly in the carrier legs as shown in Figure 6, the split ends 60 of the spacer rings 50 should be positioned so they are displaced from the portion of the annular groove 46 in the carrier legs 18, but are closely adjacent the chamfered edge 57. The clamped differential cage 22, bearing assemblies 40 and split spacer rings 50 are placed in position in the grooved bore portion of the carrier legs 18 and the assembly rotated to move one of the nibs 62 on the split ring ends 60 into engagement with the chamfered bottom edge of the carrier leg portion of groove 46 (Figure 2). This is not absolutely necessary however, because if there is any tendency of a ring 50 to rotate it may work its way through a portion of one revolution until one nib 62 comes into alignment with groove 58 and falls into place. Bearing caps 20 are then fastened in place. The final step is to remove the draw bar nut 89, draw bar 88 and draw plates 90 leaving the other parts in proper relation as in Figure 6. Assembly of the carrier and other components of the axle assembly is accomplished in a conventional manner familiar to those skilled in this art.

The following two examples illustrate the manner of selecting proper spacer rings for two different conditions of end play:

|  | Example 1 | Example 2 |
| --- | --- | --- |
|  | Inches | Inches |
| Reference Ring | 0.290 | 0.290 |
| Reference Ring | 0.290 | 0.290 |
| End Play (measured) | 0.017 | 0.019 |
| Add (tolerance) | 0.012 | 0.012 |
|  | 0.609 | 0.611 |
| Use 0.610 inch and therefore use two 0.305 inch ring spacers. | Use 0.615 inch and therefore use one 0.310 inch and one 0.305 inch ring spacers. | |

An alternate assembly and bearing adjustment procedure may be used when the special draw bar 88 and draw plates 90 are not readily available as under field conditions. In this procedure the reference rings 86, ground to 0.290 inch thickness, the bearing assemblies 40 and the differential cage assembly 22 are placed and held in the carrier legs 18 by gravity, the caps 20 being removed. The axial end play of the differential cage and gear assembly 22 plus 24 and 26 is then measured with an indicator gauge. The assembly is then removed from the carrier legs and the reference rings 86 removed and replaced by two split spacer rings 50 which have a total ring thickness increase of 0.017 to 0.022 plus the measured end play. The assembly is again placed in the carrier legs 18, taking the precaution to position the split ends 60 of rings 50 outside of the carrier leg groove but closely adjacent the chamfered groove edge 57 for subsequent proper positioning of the nibs 62. As the assembly, in this procedure, is not clamped for preload, only one of the split rings can be freely positioned in its respective groove. The one ring 50 is placed in its carrier leg groove portion 46 and the differential cage 22, bearing assemblies 40 and opposite ring 50 pushed axially to abut the elements together and against the one ring resting in its groove. The other ring 50 is then forced into its respective carrier leg groove 46 by repeated blows as with a drift bar and hammer (not shown). The bearing caps 20 are then placed and fastened in position against the carrier legs 18, forming the transverse groove 58 in the bottom of annular groove 46 that retains the one nib 62 of split spacer ring 50 to prevent its rotation, and resulting in the assembled carrier and differential cage assembly with properly preloaded differential bearings.

When using the modified split spacer rings 74 with the disc key 72 (Figures 7 and 8) in lieu of nibs 62, the disc key 72 must be inserted between the ring ends 80 and the rings rotated to seat the disc keys 72 in their respective carrier leg recesses 68 prior to installing and fastening the bearing caps 20.

There is hereby provided a novel and improved differential bearing mounting, preload adjustment procedure and apparatus for accomplishing the adjustment and mounting. The invention uses individually fitted split rings in lieu of conventional bearing adjusting nuts for providing spaced preloading abutment faces for the differential bearings. The rings are of hardened steel and accurately ground to provide desired thickness and an accurate cross sectional profile; and, by structural cooperation with machined grooves in the carrier leg and cap bearing bores provide hardened surface abutments for the side faces of the outer races of the differential cage support bearings. Since the bearing caps retain the spacer rings in the assembly there is no change in the initial bearing adjustment during life of the assembly. The method of assembly of the invention ensures that differential support bearing drag will fall within predetermined desired limits by providing special assembly tools and a definite assembly procedure for obtaining consistent correct bearing preloads in final assembly. An alternate assembly procedure is also disclosed for use when special assembly tools are not readily available.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle assembly wherein an axle housing having an opening has a differential carrier secured over said opening and an axle differential mechanism mounting means projecting within said axle housing, said means comprising two fixedly spaced legs rigid with the carrier and bearing caps secured upon the ends of said legs, said legs and bearing caps defining similar aligned bores, annular bearing assemblies mounted in each of said bores, axle differential mechanism disposed between said legs and having end portions rotatably mounted in said bearing assemblies, each of said bearing assemblies comprising an outer race secured within one of said bores, an inner race secured upon one of said end portions of the differential mechanism and bearing elements retained between said races, means on said differential mechanism end portions axially abutting the inner ends of said inner races, continuous circumferential flat-sided grooves in said bores adjacent the outer ends of said outer races, and flat-sided retainer rings of predetermined axial thickness seated in said grooves tightly abutting the outer ends of said outer bearing races, the sum of the axial thickness of said retainer rings, the axial length of both of said bearing assemblies in their unstressed condition and the axial spacing between said inner race inner end abutting means being sufficiently greater than the axial spacing between the sides of said grooves most remote from the center of said mechanism that said bearing assemblies are subjected to a circumferentially uniform predetermined preloading force while said rings, bearing assemblies and differential mechanism end portions are axially confined between said most remote groove side walls.

2. In the assembly defined in claim 1, each of said rings being a split ring, and coacting means in each said bore and one end of said ring for anchoring the ring against circumferential displacement in said groove.

3. In combination, a differential carrier for an axle drive unit having two spaced apart separable differential supporting leg and cap assemblies, said assemblies defining smooth bearing retaining bores in coaxial alignment and each bore having adjacent its outer end an annular flat-sided groove, a differential cage having oppositely extended side hubs disposed and supported in said retaining bores, said support comprising tapered roller bearing assemblies having inner races fixed on said cage hubs and outer races fixed in said retaining bores, and means for retaining and loading said bearing assemblies in the opposite carrier retaining bores comprising flat-sided split rings of predetermined thickness disposed in and axially rigid with said bore grooves and tightly backing the outer race of each of said bearing assemblies, the axial spacing between the flat sides of said grooves most remote from the center of said cage being sufficiently less than the axial spacing between the flat sides of said rings most remote from the center of said cage in the unstressed condition of the components of the subassembly of said rings and said bearing assemblies on said cage hubs that said bearing assemblies are subjected to a circumferentially uniform predetermined preloading force while said subassembly is maintained axially confined between said most remote groove side walls.

4. The combination defined in claim 3, wherein the diameters of said bores and of said outer bearing races are proportioned to provide a loose free fit of the outer bearing race within the bore.

5. The combination defined in claim 3, wherein said split rings are flat sided hardened metal rings.

6. In combination, a differential carrier for an axle drive unit having two spaced apart separable differential supporting leg and cap assemblies, said assemblies defining smooth bearing retaining bores in coaxial alignment, an annular flat-sided circumferential groove provided in each bore, a differential cage having oppositely extended side hubs extending into said retaining bores, tapered roller bearing assemblies having inner races fixed on said cage hubs and outer races fixed in said retaining bores, and means for retaining and axially loading said bearing assemblies in the opposite carrier retaining bores comprising flat-sided split rings of predetermined thickness disposed in said annular grooves and tightly backing the outer race of said bearing assemblies, the axial spacing between the flat sides of said grooves most remote from the center of said cage being sufficiently less than the axial spacing between the flat sides of said rings most remote from the center of said cage in the unstressed condition of the components of the subassembly of said rings and said bearing assemblies on said cage hubs that said bearing assemblies are subjected to a circumferentially uniform predetermined preloading force while said subassembly is maintained axially confined between said most remote groove side walls.

7. The combination defined in claim 6, wherein the diameters of said bores and of said outer bearing races are such as to provide loose free fit between the outer circumferences of said outer bearing races and the inner circumference of said bores.

References Cited in the file of this patent

UNITED STATES PATENTS

| 1,662,601 | Demchuk | Mar. 13, 1928 |
| 1,722,493 | Brunner | July 30, 1929 |
| 1,774,160 | Sweet | Aug. 26, 1930 |
| 1,748,971 | Buckwalter | Mar. 4, 1930 |
| 1,748,973 | Buckwalter | Mar. 4, 1930 |
| 1,842,155 | Eastburg | Jan. 19, 1932 |
| 2,082,944 | Evans | June 8, 1937 |
| 2,139,555 | McKercher et al. | Dec. 6, 1938 |
| 2,183,667 | Buckendale | Dec. 19, 1939 |
| 2,253,412 | Young | Aug. 19, 1941 |
| 2,287,767 | Dodge | June 30, 1942 |
| 2,346,950 | Strehlow | Apr. 18, 1944 |